(12) United States Patent
Ishikawa et al.

(10) Patent No.: US 9,398,138 B2
(45) Date of Patent: Jul. 19, 2016

(54) SELECTION SUPPORT APPARATUS AND SELECTION SUPPORT METHOD

(71) Applicant: BRIDGESTONE SPORTS CO., LTD., Minato-ku, Tokyo (JP)

(72) Inventors: Tatsuya Ishikawa, Chichibu (JP); Hirotada Iwade, Chichibu (JP)

(73) Assignee: BRIDGESTONE SPORTS CO., LTD, Tokyo (JP)

( * ) Notice: Subject to any disclaimer, the term of this patent is extended or adjusted under 35 U.S.C. 154(b) by 0 days.

(21) Appl. No.: 14/259,705

(22) Filed: Apr. 23, 2014

(65) Prior Publication Data
US 2014/0357427 A1 Dec. 4, 2014

(30) Foreign Application Priority Data

May 31, 2013 (JP) ................................. 2013-116192

(51) Int. Cl.
*A63B 69/36* (2006.01)
*A63B 57/00* (2015.01)
*H04M 1/725* (2006.01)

(52) U.S. Cl.
CPC .......... *H04M 1/7253* (2013.01); *A63B 69/3632* (2013.01); *A63B 2102/32* (2015.10); *A63B 2220/34* (2013.01); *A63B 2220/40* (2013.01); *A63B 2220/833* (2013.01); *A63B 2225/20* (2013.01); *A63B 2225/50* (2013.01)

(58) Field of Classification Search
CPC ................................ A63B 69/36; A63B 57/00
USPC ....................................................... 473/407
See application file for complete search history.

(56) References Cited

U.S. PATENT DOCUMENTS

| 6,083,123 | A  | * | 7/2000 | Wood ............................ 473/409 |
| 7,871,333 | B1 | * | 1/2011 | Davenport ............. A63B 57/00 273/108.2 |
| 8,210,960 | B1 | * | 7/2012 | Davenport ......... A63B 24/0006 273/108.2 |
| 8,574,100 | B2 |   | 11/2013 | Hasegawa et al. |
| 2005/0215336 | A1 | * | 9/2005 | Ueda et al. .................... 473/131 |
| 2010/0151956 | A1 | * | 6/2010 | Swartz et al. .................. 473/199 |
| 2011/0230273 | A1 | * | 9/2011 | Niegowski et al. ........... 473/199 |

(Continued)

FOREIGN PATENT DOCUMENTS

| JP | 2010-155074 A | 7/2010 |
| JP | 2012-016582 A | 1/2012 |

(Continued)

OTHER PUBLICATIONS

"Swingweight" published on or before Jan. 5, 2012 and printed from URL<http://web.archive.org/web/20120105071648/http://advancedballstriking.com/Swing_weights.pdf>,.*

*Primary Examiner* — Jason Skaarup
(74) *Attorney, Agent, or Firm* — Sughrue Mion, PLLC

(57) ABSTRACT

A selection support apparatus acquires a plurality of types of characteristic data representing a swing characteristic of a testing golfer based on a test shot result of a golf club. The apparatus calculates each of recommended values for the testing golfer in association with a plurality of types of characteristic values that characterize a component of a golf club based on the plurality of types of characteristic data. The apparatus selects, based on the recommended values and component information representing a correspondence between components and the plurality of types of characteristic values, a recommended component from components listed in the component information.

9 Claims, 7 Drawing Sheets

(56) References Cited

U.S. PATENT DOCUMENTS

| | | | |
|---|---|---|---|
| 2011/0230274 A1* | 9/2011 | Lafortune et al. | 473/217 |
| 2011/0300959 A1 | 12/2011 | Hasegawa et al. | |
| 2012/0108353 A1 | 5/2012 | Kamino et al. | |
| 2012/0108363 A1 | 5/2012 | Hasegawa et al. | |
| 2012/0108364 A1 | 5/2012 | Hasegawa et al. | |
| 2012/0136464 A1 | 5/2012 | Saito et al. | |
| 2013/0143685 A1* | 6/2013 | Margoles et al. | 473/231 |
| 2013/0260909 A1* | 10/2013 | Margoles et al. | 473/223 |
| 2013/0288829 A1* | 10/2013 | Kimizuka et al. | 473/409 |
| 2014/0357426 A1* | 12/2014 | Ishikawa | G06K 9/00342 473/407 |

FOREIGN PATENT DOCUMENTS

| | | | |
|---|---|---|---|
| JP | 2012-095826 A | 5/2012 | |
| JP | 2012-095844 A | 5/2012 | |
| JP | 2012-095850 A | 5/2012 | |
| JP | 2012-110594 A | 6/2012 | |

* cited by examiner

| TYPE | CENTER-OF-GRAVITY ANGLE (deg) | MOMENT OF INERTIA (g·cm²) |
|---|---|---|
| A | 26 | 3500 |
| B | 26 | 3600 |
| C | 27 | 3800 |
| D | 27 | 3900 |

SELECTION SUPPORT APPARATUS AND SELECTION SUPPORT METHOD

BACKGROUND OF THE INVENTION

1. Field of the Invention

The present invention relates to a selection support technique for components of a golf club such as a head and a shaft.

2. Description of the Related Art

There has been a growing trend among golfers to desire golf clubs more fitting to themselves. Particularly growing is the tendency to want components such as a head and a shaft fitting to the individuals on a component basis. To meet this requirement, for example, methods of recommending a head or a shaft based on a test shot result have been proposed (for example, Japanese Patent Laid-Open Nos. 2012-16582 and 2012-95850).

There exist many types of components circulating in the market, and a plurality of types of indices are used to evaluate their characteristics. Hence, a method capable of efficiently recommending a component fitting to a golfer is demanded.

SUMMARY OF THE INVENTION

It is an object of the present invention to provide a mechanism capable of efficiently recommending a component fitting to a golfer.

According to the present invention, for example, there is provided a selection support apparatus comprising: a characteristic data acquisition unit configured to acquire a plurality of types of characteristic data representing a swing characteristic of a testing golfer based on a test shot result of a golf club; a calculation unit configured to calculate each of recommended values for the testing golfer in association with a plurality of types of characteristic values that characterize a component of a golf club based on the plurality of types of characteristic data; and a selection unit configured to select, based on the recommended values and component information representing a correspondence between components and the plurality of types of characteristic values, a recommended component from components listed in the component information.

Further features of the present invention will become apparent from the following description of exemplary embodiments (with reference to the attached drawings).

DESCRIPTION OF THE EMBODIMENTS

<First Embodiment>

Figure 1:
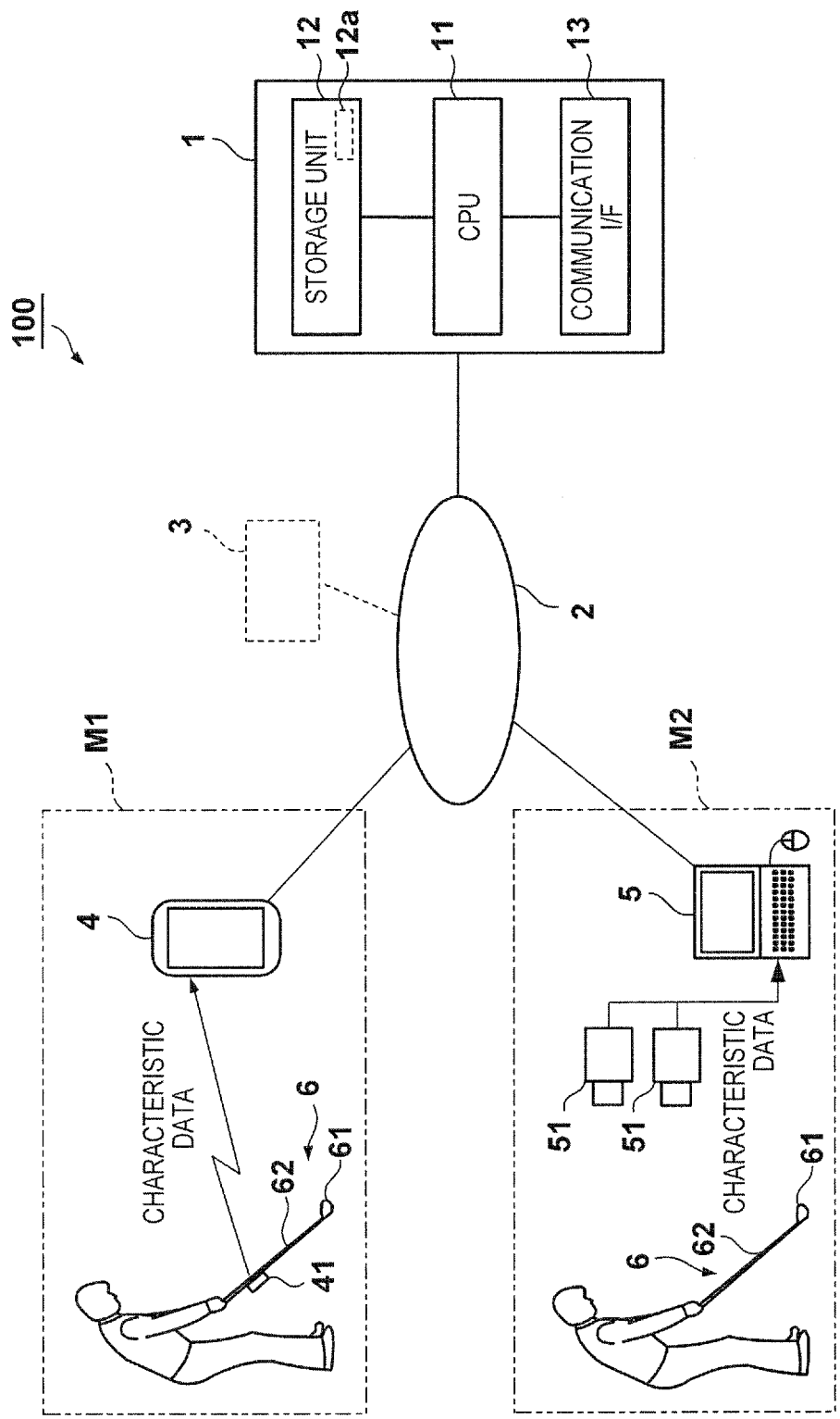
FIG. 1 is an explanatory view of the arrangement of an information distribution system representing an application example of the present invention.

FIG. 1 is an explanatory view of the arrangement of an information distribution system 100 to which a selection support apparatus 1 according to an embodiment of the present invention is applied. The information distribution system 100 distributes information about golf clubs using the selection support apparatus 1 as an information distribution server. The selection support apparatus 1 can communicate with a portable terminal 4 or a personal computer 5 via a network 2. The selection support apparatus 1 receives a request from the portable terminal 4 or the personal computer 5, and transmits information about golf clubs to them. The network 2 is, for example, the Internet.

The selection support apparatus 1 is formed from, for example, a general server computer, and includes a CPU 11, a storage unit 12, and a communication interface 13. The storage unit 12 includes, for example, a RAM, a ROM, a hard disk, and the like. The CPU 11 executes programs stored in the storage unit 12 and, particularly, executes processing associated with selection support of components of a golf club (to be described later). The communication interface 13 is an interface configured to perform data communication with another apparatus (for example, the portable terminal 4 or personal computer 5) via the network 2.

The storage unit 12 stores component information 12a about components of golf clubs. There are various types of golf clubs, and examples are wood type golf clubs such as drivers, utility type (hybrid type) golf clubs, iron type golf clubs, and putters. Examples of components are a head, shaft, grip, and ferrule.

Note that the component information 12a may wholly or partially be stored in a server 3 communicable via the network 2. In this case, the selection support apparatus 1 can access the server 3 via the network 2 and acquire the component information 12a.

The selection support apparatus 1 provides information of components of golf clubs according to the swing characteristic of a testing golfer based on the test shot results of golf clubs. A system for measuring the swing characteristic can have any arrangement. In this embodiment, measurement systems M1 and M2 will be exemplified.

The measurement system M1 includes the portable terminal 4 and a sensor 41 and is suitable for a golfer to personally measure the swing characteristic. The portable terminal 4 is, for example, a smartphone, and has a short distance wireless communication function for the sensor 41 and a wireless communication function via the network 2. The sensor 41 is, for example, a 9-axis sensor (three axes for acceleration, three axes for angular velocity, and three axes for orientation) that is attached to a golf club 6 and measures the three-dimensional behavior of it. The golf club 6 includes a head 61 and a shaft 62. The sensor 41 is attached to, for example, the shaft 62. A golfer conducts a test shot session using the golf club 6 with the sensor 41 in a driving range or the like. The sensor 41 measures the behavior and transmits a plurality of types of characteristic data as a measurement result to the portable terminal 4. The portable terminal 4 directly holds the received characteristic data or converts it to characteristic data of a predetermined format processable on the side of the selection support apparatus 1.

The measurement system M2 includes the personal computer 5 and a plurality of image capturing apparatuses 51 and is suitable to measure the swing characteristic at a golf shop or the like. The personal computer 5 has a function of processing images captured by the image capturing apparatuses 51 and a wireless communication function via the network 2. The image capturing apparatuses 51 are, for example, video cameras. A golfer conducts a test shot session using the golf club 6 in a test shot room or the like. In the test shot room or the like, the plurality of image capturing apparatuses 51 capture the testing golfer from a number of directions and capture the three-dimensional behavior of the golf club 6. The captured images are received and analyzed by the personal computer 5 as characteristic data and converted into a plurality of types of characteristic data of having a predetermined format processable on the side of the selection support apparatus 1.

Figure 2A:
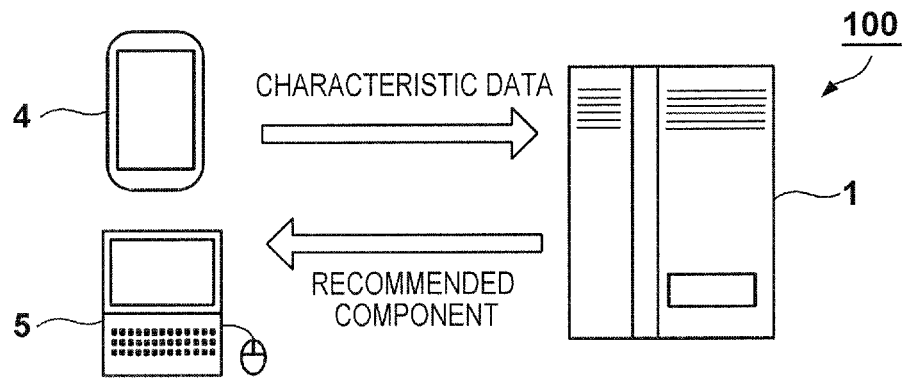
FIG. 2A is an explanatory view of the system shown in FIG. 1.

FIG. 2A is a view giving an outline of information exchange in the information distribution system 100. The above-described measurement system M1 or M2 measures characteristic data representing the swing characteristic of a testing golfer based on a test shot result of a golf club. The portable terminal 4 or the personal computer 5 accesses, for example, a web page provided on the network 2 by the selection support apparatus 1 and transmits the measured characteristic data together with a request to provide information of recommended components of a golf club. The selection support apparatus 1 selects recommended components based on the received characteristic data and transmits the information of the components to the portable terminal 4 or the personal computer 5 of the request source. The testing golfer can obtain, on the portable terminal 4 or the personal computer 5, the information of the components of the golf club according to his/her swing characteristic. This can support the golfer in selecting components.

Figure 2B:
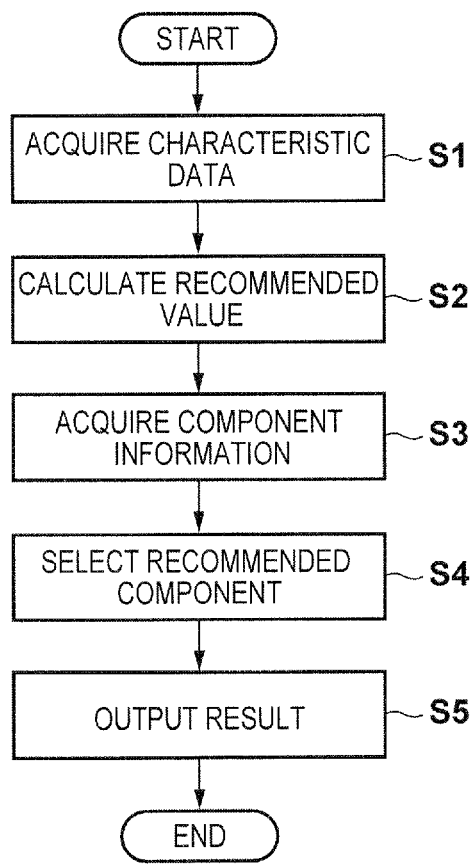
FIG. 2B is a flowchart showing an example of processing executed by a selection support apparatus according to an embodiment of the present invention.

FIG. 2B is a flowchart showing an example of selection support processing executed by the CPU 11 of the selection support apparatus 1. This processing starts upon receiving a recommended component information providing request from the portable terminal 4 or the personal computer 5. In step S1, the CPU acquires a plurality of types of characteristic data representing the swing characteristic of a testing golfer. In this embodiment, the CPU receives characteristic data transmitted from the portable terminal 4 or the personal computer 5 and thus acquires them.

Examples of the characteristic data are a head speed, swing distance difference, swing angle difference, impact face angle, head track in the impact zone, and face change rate in the impact zone. The head speed is the speed of a head immediately before impact, as is widely known, and can be the index of the swing characteristic of a testing golfer associated with the capability of gaining carry.

Figure 3A:
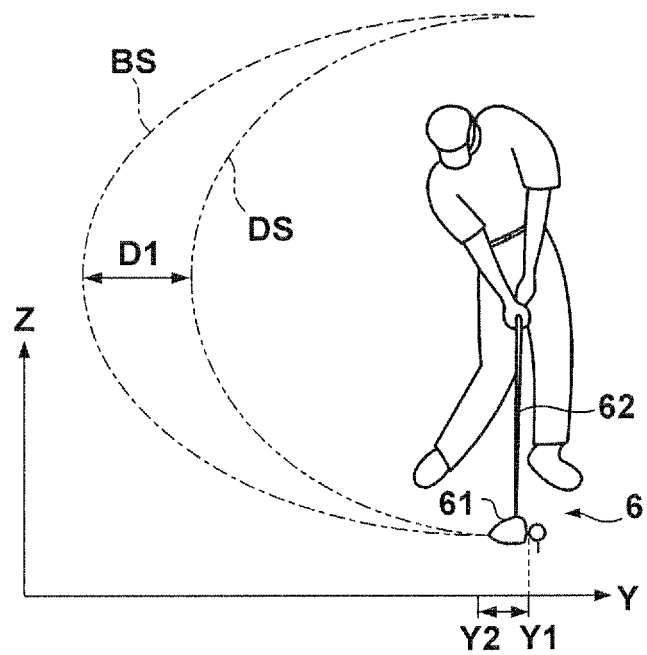
FIGS. 3A and 3B are explanatory views of examples of characteristic data.
Figure 3B:
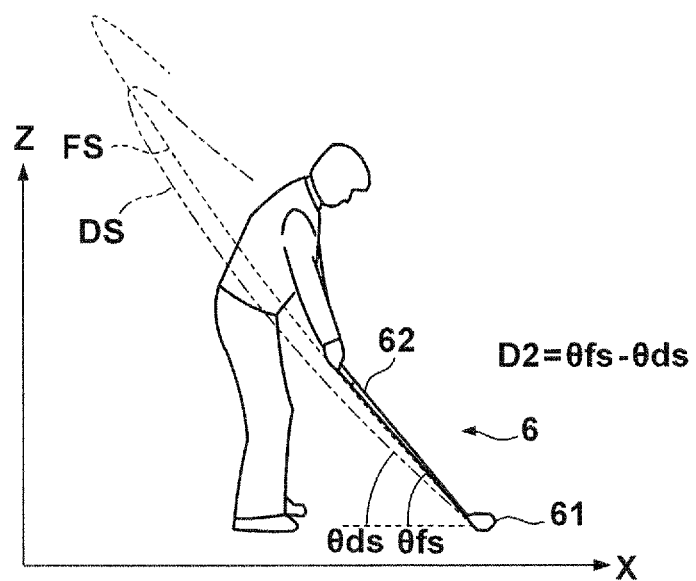

The swing distance difference and the swing angle difference are characteristics associated with the head track during a swing. FIGS. 3A and 3B are explanatory views of examples of these characteristics. As shown in FIGS. 3A and 3B, assume a virtual three-dimensional space having a Y-axis set in the horizontal direction along a target line direction, an X-axis set in the horizontal direction perpendicular to the Y-axis, and a Z-axis set in the vertical direction. Note that the coordinate axes may be set by, for example, defining the moving direction of the head immediately after take back as the Y-axis direction.

The swing distance difference can be defined as, for example, a difference D1 between a track BS of the head 61 in a backswing and a track DS of the head 61 in a downswing when the track of the head 61 of the golf club 6 during a swing is projected onto the Y-Z plane, as shown in FIG. 3A. The difference D1 is the maximum distance difference in the Y direction. The larger the difference D1 is, the larger the lag in a swing is. Hence, the golfer tends to be a skilled player. In addition, the head speed tends to be high.

The swing angle difference can be defined as, for example, a difference D2 between an angle $\theta fs$ of a track FS of the head 61 in a follow swing with respect to the horizontal plane and an angle $\theta ds$ of the track DS of the head 61 in a downswing with respect to the horizontal plane when the track of the head 61 of the golf club 6 during a swing is projected onto the X-Z plane, as shown in FIG. 3B. The angle $\theta fs$ can be defined as, for example, the angle of a line segment that connects an impact position Y1 and the position of the head 61 moved forward from the impact position Y1 by a predetermined distance in the Y direction with respect to the horizontal plane. Similarly, the angle $\theta ds$ can be defined as, for example, the angle of a line segment that connects the impact position Y1 and the position of the head 61 moved backward from the impact position Y1 by a predetermined distance in the Y direction with respect to the horizontal plane.

As the difference D2 becomes large to the positive side (as the angle $\theta fs$ becomes large relative to the angle $\theta ds$), the shot tends to be a hook shot. To the contrary, as the difference D2 becomes large to the negative side (as the angle $\theta fs$ becomes small relative to the angle $\theta ds$), the shot tends to be a slice shot.

As described above, the swing distance difference and the swing angle difference can be the indices of the swing characteristic of a testing golfer. Note that the above-described definitions of the swing distance difference and the swing angle difference are merely examples, and can also be defined by another criterion.

The impact face angle, the head track in the impact zone, and the face change rate in the impact zone will be described next with reference to FIGS. 4A and 4B. Note that the impact zone is the head moving range from the impact position to a position moved backward by a predetermined distance, and corresponds to the section (for example, 50 cm) from the impact position Y1 to a position Y2 backward along the target line, as shown in FIG. 3A.

Figure 4A:
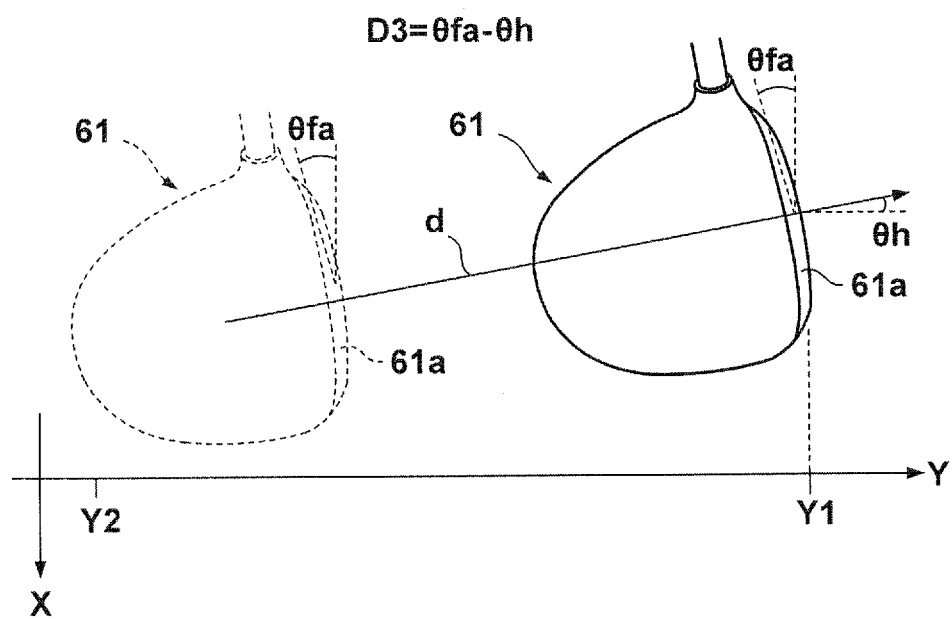
FIGS. 4A and 4B are explanatory views of an example of characteristic data.
Figure 4B:
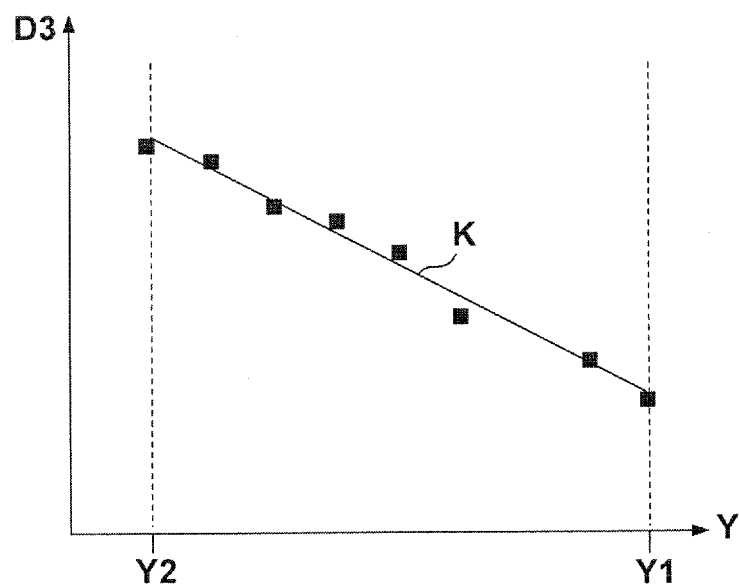

Referring to FIG. 4A, the impact face angle indicates the orientation of a face 61*a* of the head 61 at the impact position Y1, and is defined as an angle $\theta fa$ made by the X direction and the face 61*a* on the X-Y plane in this case. The angle $\theta fa$ can be regarded as 0 at the time of, for example, address. The larger the impact face angle is, the lower the face control capability of the testing golfer tends to be.

The head track in the impact zone indicates a moving direction d of the head 61 in the impact zone and is represented by, in this case, an angle $\theta h$ made by the Y direction and the moving direction of the head 61 on the X-Y plane. The moving direction of the head 61 can be defined as, for example, a direction in which the impact position Y1 and the position of the head 61 at the position Y2 are connected. The larger the angle $\theta h$ is, the stronger the outside-in or inside-out tendency is.

The face change rate in the impact zone indicates the change rate of the orientation of the face 61*a* with respect to the moving direction d of the head 61 in the impact zone. First, an orientation D3 of the face 61*a* with respect to the moving direction d of the head 61 is defined as $D3=\theta fa-\theta h$. The orientations D3 are calculated at a plurality of positions of the impact zone and plotted on a coordinate plane whose coordinate axes represent the orientation D3 and the position of the head 61 in the Y direction, respectively, as shown in FIG. 4B. The slope of an approximate line K indicates the face change rate. The higher the face change rate is, the more frequently face rotation tends to occur.

As described above, the impact face angle, the head track in the impact zone, and the face change rate in the impact zone can be the indices of the swing characteristic of a testing golfer.

Note that out of these characteristic data, characteristic data that need to be calculated from measured values at the time of test shot session, such as the face change rate in the impact zone, can be calculated either on the side of the portable terminal 4 or the personal computer 5 or on the side of the selection support apparatus 1.

Referring back to FIG. 2B, in step S2, the CPU calculates recommended values for the testing golfer in association with the plurality of types of characteristic values that characterize the components of a golf club based on the plurality of types of characteristic data acquired in step S1.

Examples of the characteristic values of a shaft are a flexural rigidity, flexural rigidity distribution, flex, torque, and weight. The flexural rigidity is the product of the Young's modulus of a shaft material and the geometrical moment of inertia of the shaft. The flexural rigidity distribution is data representing the flexural rigidity of each portion of a shaft. The flex indicates the hardness of a shaft and is generally categorized stepwise as S, R, X, and the like.

Examples of the characteristic values of a head are a center-of-gravity angle, center-of-gravity distance, center-of-gravity depth, center-of-gravity height, moment of inertia, lie angle, loft angle, head volume, and head weight.

Figure 5A:
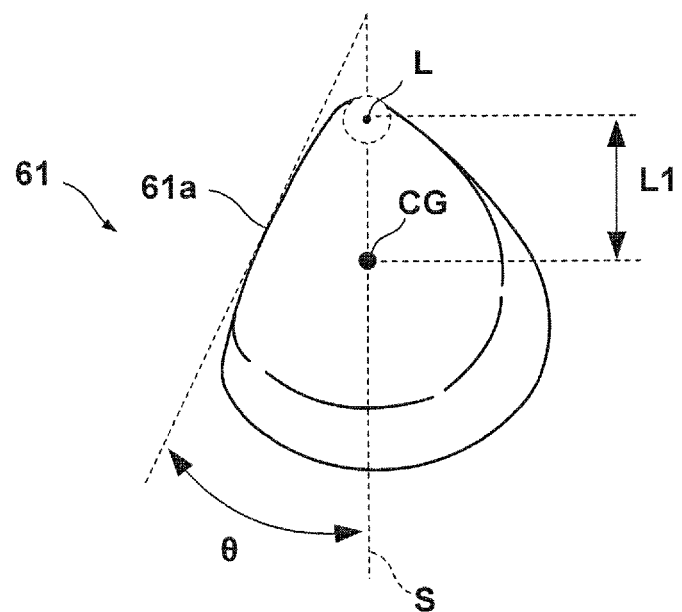
FIGS. 5A and 5B are explanatory views of an example of a characteristic value.

Some terms will be explained, although details are known well. The center-of-gravity angle is the angle made by the vertical direction and the face when a golf club is held to be rotatable about its shaft that is supported horizontally. FIG. 5A is an explanatory view. Referring to FIG. 5A, the center-of-gravity angle is an angle θ made by the face 61a and a vertical broken line S passing through a shaft axis L and a center-of-gravity position CG of the head. As shown in FIG. 5A, when the face 61a is a curved surface, a virtual plane in contact with the face center serves as a reference. The center-of-gravity distance is represented by a length L1 from the center-of-gravity position CG of the head to the shaft axis L, as shown in FIG. 5A.

Figure 5B:
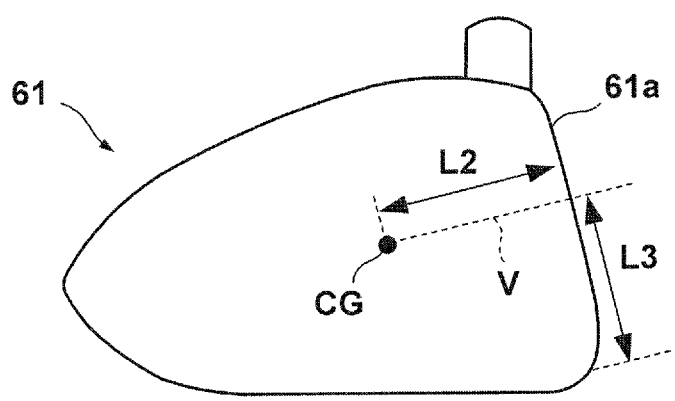

The center-of-gravity depth is represented by a length L2 of a perpendicular V from the center-of-gravity position CG of the head to the face 61a, as shown in FIG. 5B. When the face 61a is a curved surface, a virtual plane in contact with the face center serves as a reference. The center-of-gravity height is represented by a distance L3 between the perpendicular V and the leading edge.

The moment of inertia is the moment of inertia about the axis passing through the center-of-gravity position CG of the head. There are three different ways to set the axis. In this case, the moment of inertia is set about a vertical axis concerning ease of face rotation, unless otherwise specified.

In this embodiment, the plurality of types of characteristic data acquired in step S1 are substituted into a predetermined formula, thereby calculating the recommended values for the testing golfer in association with the plurality of types of characteristic values. In this case, using α and β as coefficients, the recommended values are calculated by $$\text{recommended value} = \text{characteristic data} \times \alpha + \beta \quad (1)$$

By this calculation method, the recommended values can be obtained relatively easily.

A case where a head is defined as a selection target, and a recommended head is selected based on two types of characteristic values, the center-of-gravity angle and the moment of inertia, will be described. In this case, the impact face angle and the face change rate in the impact zone are used as characteristic data.

Let H1 be the recommended value of the center-of-gravity angle. The recommended value H1 can be calculated based on the relationship to the impact face angle by, for example, $$H1 \text{ (deg)} = \text{impact face angle (deg)} \times 0.8 + 25$$

This equation indicates that the larger the impact face angle is, the larger the center-of-gravity angle of a head to be recommended is.

Let H2 be the recommended value of the moment of inertia. The recommended value H2 can be calculated based on the relationship to the face change rate in the impact zone by, for example, $$H2 \text{ (g·cm}^2\text{)} = \text{face change rate (deg/m)} \times (-20) + 4400$$

This equation indicates that the higher the face change rate is, the smaller the moment of inertia of a head to be recommended is.

Figures 6A, 6B:
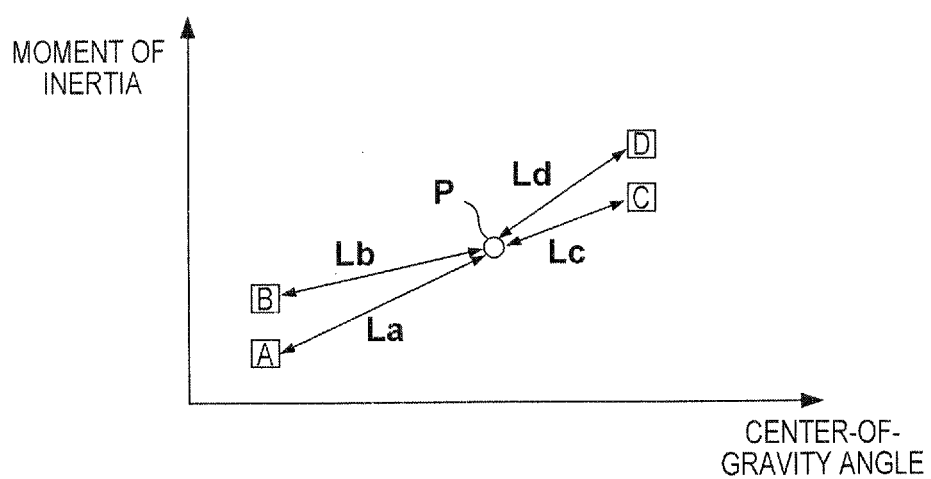
FIG. 6A is a table showing an example of component information.
FIG. 6B is an explanatory view of an example of a recommended component selection method.

Referring to FIG. 2B, in step S3, the CPU acquires the component information 12a. In this embodiment, the component information 12a is stored in the storage unit 12 and therefore read out from the storage unit 12. FIG. 6A is a conceptual view showing an example of the component information 12a. In the example of FIG. 6A, four head types A to D are assumed, and their correspondences with the center-of-gravity angle and the moment of inertia as characteristic values are shown. For example, in the head A, the center-of-gravity angle is 26 (deg), and the moment of inertia is 3,500 (g·cm²).

Referring back to FIG. 2B, in step S4, a recommended head is selected from the components (heads A to D) listed in the component information 12a based on the recommended values H1 and H2 calculated in step S2 and the component information 12a acquired in step S3. When selecting a recommended head, a plurality of characteristic values (center-of-gravity angle and moment of inertia) of a head are used as a reference. This makes it possible to easily narrow down heads and also recommend a more fitting head to the golfer who is the testing golfer. Hence, a component fitting to a golfer can be recommended efficiently.

In this embodiment, a head having characteristic values closest to the recommended values H1 and H2 is selected as a recommended head. The closeness of characteristic values can be discriminated using, as a reference, a distance on multidimensional coordinates with characteristic values plotted along the coordinate axes. Conceptually speaking, recommended components defined by the recommended values are plotted, and components are also plotted. The distances between them are calculated. FIG. 6B shows an example.

The example of FIG. 6B shows two-dimensional coordinates whose coordinate axes represent the center-of-gravity angle and the moment of inertia. The position of a point P is decided by the recommended values H1 and H2. Points A to D represent the heads A to D recorded in the component information 12a, and their positions are decided by the characteristic values recorded in the component information 12a. The distances between the point P and the heads A to D are indicated by La to Ld, respectively. A head corresponding to the shortest one of the distances La to Ld is selected as a recommended head. In the example of FIG. 6B, the head C is selected. In the above-described way, a head having characteristic values closest to the recommended values H1 and H2 can be selected as a recommended head. A head close to a plurality of types of characteristic values in general can be selected as a recommended head.

Note that although one component is recommended in this embodiment, a plurality of components may be recommended. For example, top-two components may be selected.

The formula used to calculate the distance of each component in the component information 12a from a characteristic value can be set based on the Pythagorean theorem as, for example, $$\text{distance} = \sqrt{[\{(\text{characteristic value 1} - \text{recommended value 1})/\gamma\}^2 + \{(\text{characteristic value 2} - \text{recommended value 2})/\delta\}^2]}$$

where γ and δ are weighting coefficients. In a head for a driver, the center-of-gravity angle (deg) and the moment of inertia (g·cm$^2$) are generally about 15 to 30 (deg) and about 3,000 to 6,000 (g·cm$^2$), respectively, and have a numerical value difference of two orders of magnitude. Hence, to equally handle the two types of characteristic values when calculating the distance, for example, γ=1, and δ=100 are set. Conversely, priority can be given to some types of characteristic values by setting γ and δ.

Referring back to FIG. 2B, in step S5, the selection result in step S4 is output. In this embodiment, the selection result is transmitted to the portable terminal 4 or the personal computer 5 of the recommended component request source. Information to be transmitted may include not only information (for example, component name and maker) that specifies a recommended component but also its characteristic values and the like. The recommended values calculated in step S2 may also be included.

Processing of one unit thus ends. The golfer (testing golfer) who has requested recommended component selection is given the information of a component fitting to him/her.

Note that in this embodiment, a server-client system including the selection support apparatus 1 as a server and the portable terminal 4 and the personal computer 5 as clients has been described. However, a standalone system may be formed by imparting the functions of the selection support apparatus 1 to the portable terminal 4 or the personal computer 5. In this case, the portable terminal 4 or the personal computer 5 executes the same processing as that shown in FIG. 2B. More specifically, characteristic data acquisition in step S1 is, for example, characteristic data (measurement data) acquisition from the sensor 41 or the image capturing apparatus 51. Result output in step S5 is, for example, displayed by the display panel of the portable terminal 4 or the personal computer 5. The component information 12a can also be stored in the portable terminal 4 or the personal computer 5. However, a form that acquires the component information 12a from the server 3 can also be employed.

In this embodiment, a case where a head is selected has mainly been exemplified. However, another component such as a shaft can also be selected in accordance with the same procedure as described above, as a matter of course. Recommended components can be presented for not only one type of component but also a plurality of types of components (for example, head and shaft).

A recommended component is selected based on two types of characteristic values (center-of-gravity angle and moment of inertia). However, it may be selected based on three or more types of characteristic values. Each of the recommended values H1 and H2 is calculated from one type of characteristic data (impact face angle or face change rate in the impact zone). However, one recommended value may be calculated from a plurality of types of characteristic data.

<Second Embodiment>

In the first embodiment, a recommended component of a golf club is selected. However, an arrangement for selecting a recommended golf club including a selected recommended component and presenting it to a golfer can also be employed.

Figure 7A:
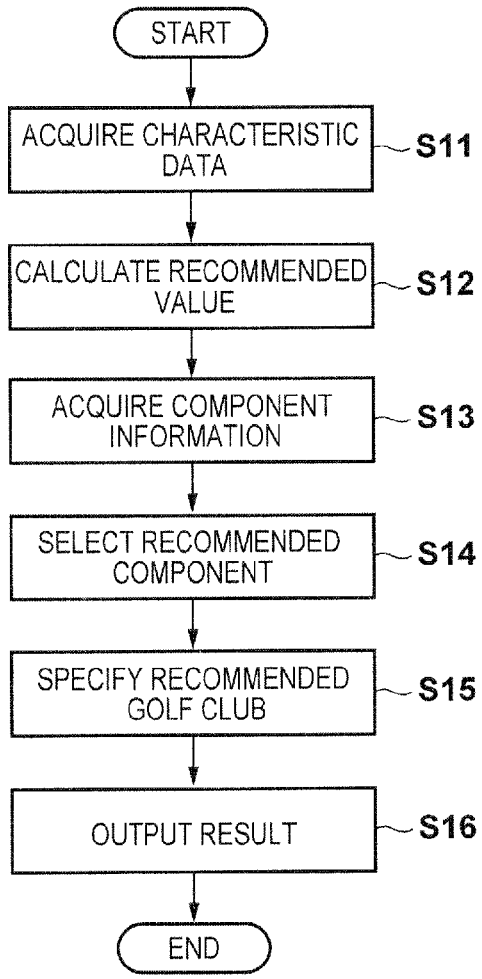
FIGS. 7A and 7B are flowcharts showing other examples of processing.

FIG. 7A is a flowchart showing an example of selection support processing executed by a CPU 11 of a selection support apparatus 1 when presenting a recommended golf club. The processes of steps S11 to S14 are the same as in steps S1 to S4 of the processing of the first embodiment shown in FIG. 2B, and a description thereof will be omitted.

In step S15, the CPU specifies a recommended golf club including a recommended component selected in step S14. For example, when a recommended head is selected in step S14, a shaft, a grip, and the like to be combined with the recommended head are selected, thereby specifying a recommended golf club. Other components to be combined with the recommended component selected in step S14 may be defined in component information 12a and selected. For example, head types and shafts corresponding to them can be defined in the component information 12a, and a shaft corresponding to a recommended head can be selected. Alternatively, head types and commercially available golf clubs including them may be defined in the component information 12a, and a commercially available golf club corresponding to a recommended head may be selected. In this case, one or a plurality of recommended golf clubs can be selected.

In step S16, the selection results in steps S14 and S15 are output. As in the processing of step S5 of the first embodiment, the selection results can be transmitted to a portable terminal 4 or a personal computer 5 of the request source.

<Third Embodiment>

Figure 7B:
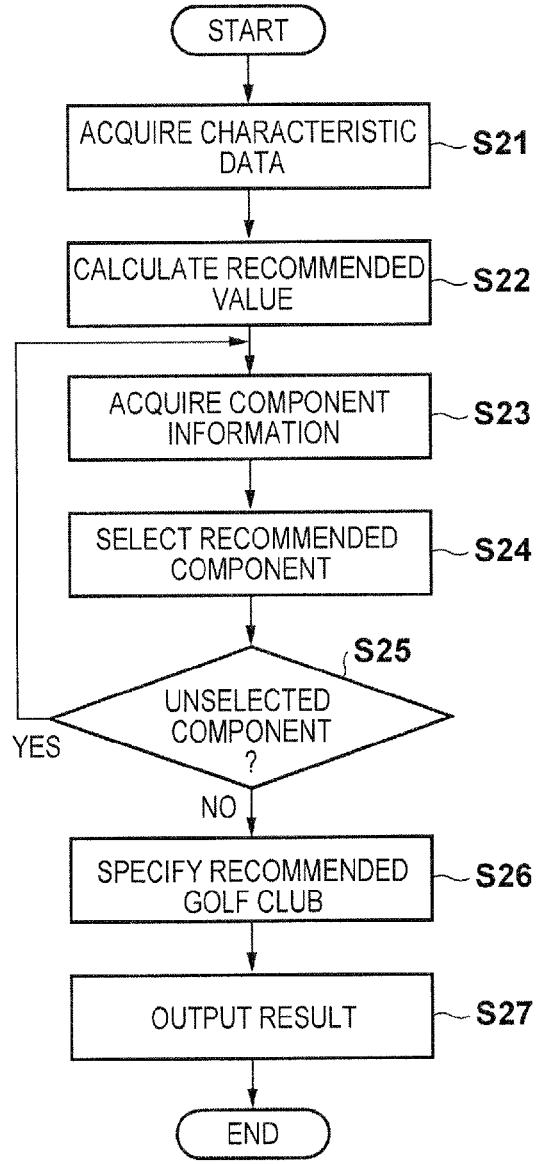

In the processing example shown in FIG. 7A, a recommended component is selected for one component in accordance with the same procedure as in the first embodiment, and other components are selected based on the selected recommended component. However, recommended components may be selected for a plurality of components in accordance with the same procedure as in the first embodiment. FIG. 7B is a flowchart showing an example of selection support processing executed by a CPU 11 of a selection support apparatus 1. Assume a case where a recommended head is selected, and a recommended shaft is then selected. An arrangement for selecting recommended components for all components can also be employed.

The processes of steps S21 to S24 are the same as in steps S1 to S4 of the processing of the first embodiment shown in FIG. 2B, and a recommended component is selected. First, a recommended head is selected. In step S25, it is determined whether an unselected component exists. Since a recommended shaft is unselected, the process returns to step S23 to acquire component information for shafts and execute the same processing as described above. In step S24, a recommended shaft is selected. In next step S25, since selection the recommended head and the recommended shaft has ended, the process advances to step S26.

Note that in this embodiment, the recommended components are selected one by one. However, a plurality of recommended components (for example, recommended head and recommended shaft) may simultaneously be selected by parallel processing.

In step S26, the CPU specifies a recommended golf club. In this case, the CPU specifies a golf club including the recommended head and the recommended shaft selected in step S24 as a recommended golf club. To select other components such as a grip, the same method as the selection method described concerning step S15 of FIG. 7A can be employed, and a commercially available golf club including the recommended head and the recommended shaft selected in step S24 may be selected.

In step S27, the selection results in steps S24 and S26 are output. As in the processing of step S5 of the first embodiment, the selection results can be transmitted to a portable terminal 4 or a personal computer 5 of the request source.

<Other Embodiments>

In the above-described embodiments, a recommended component or a recommended golf club is presented to a golfer. However, the selection support apparatus 1 may receive an order of purchase.

The selection support apparatus 1 can store and manage the test shot results of a golfer. This allows the golfer to compare past test shot results with a current test shot result or compare past recommended components or recommended golf clubs with a current recommended component or recommended golf club.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-116192, filed May 31, 2013, which is hereby incorporated by reference herein in its entirety.

What is claimed is:

1. A selection support system comprising a selection support apparatus and a measurement apparatus capable of communicating with the selection support apparatus through a network, wherein the measurement apparatus includes;

a measuring device configured to measure a swing of a testing golfer; and a terminal device configured to be communicatively connected to the measuring device, the terminal device transmitting a plurality of types of characteristic data representing a swing characteristic of the testing golfer based on a measurement result of the measuring device to the selection support apparatus through the network, the selection support apparatus includes a storage device, a processor and a transmitter, the storage device is configured to store component information representing a correspondence between golf club components and a plurality of types of characteristic values that characterize the components, the processor is configured to convert the plurality of types of characteristic data to a plurality of types of recommended values which corresponding to the plurality of types of characteristic values, each recommended value is calculated based on the characteristic data, using α and β as coefficients, by recommended value=characteristic data×α+β, where the coefficients α and β are fixed values according to the corresponding types of characteristic values and the fixed values are different for each of the corresponding types of characteristic values, the processor is further configured to select, based on the plurality of types of recommended values and the plurality of types of characteristic values, a recommended component from components listed in the component information, and the transmitter is configured to transmit information of the recommended component to the terminal device through the network.

2. The system according to claim 1, wherein the processor is further configured to specify a recommended golf club including the recommended component selected.

3. The system according to claim 1, wherein the plurality of types of characteristic data include a plurality of types out of data representing an orientation of a face of a head at a time of impact, data representing a change rate of an orientation of an face with respect to a moving direction of the head within a head moving range from an impact position to a position moved backward by a predetermined distance, a head speed, a head track difference between a backswing and a downswing, a head track difference between a downswing and a follow swing, and a head track within a head moving range from an impact position to a position moved backward by the predetermined distance.

4. The system according to claim 1, wherein the plurality of types of characteristic values include a plurality of types out of a center-of-gravity angle of a head, a moment of inertia of a head, a center-of-gravity distance of a head, a center-of-gravity depth of a head, a center-of-gravity height of a head, a lie angle of a head, a loft angle of a head, a head volume, a head weight, a flexural rigidity of a shaft, a flexural rigidity distribution of a shaft, a flex of a shaft, a torque of a shaft, and a weight of a shaft.

5. The system according to claim 1, wherein the processor is configured to select a component having characteristic values closest to the recommended values as the recommended component.

6. A selection support method executed by a selection support apparatus in a system, the system including the selection support apparatus and a measurement apparatus capable of communicating with the selection support apparatus through a network, the measurement apparatus including a measuring device configured to measure a swing of a testing golfer; and a terminal device configured to communicatively connected to the measuring device, the method comprising:

a characteristic data acquisition step of acquiring a plurality of types of characteristic data representing a swing characteristic of the testing golfer based on a measurement result of the measuring device;

a calculation step of converting the plurality of types of characteristic data to a plurality of recommended values;

a selection step of selecting a recommended component from components listed in a component information; and a transmission step of transmitting information of the recommended component to the terminal device through the network, wherein the component information represents a correspondence between golf club components and a plurality of types of characteristic values that characterize the components, the plurality of types of recommended values correspond to the plurality of types of characteristic values, in the calculation step, each recommended value is calculated based on the characteristic data, using α and β as coefficients, by recommended value=characteristic data×α+β, where the coefficients α and β are fixed values according to the corresponding types of characteristic values and the fixed values are different for each of the corresponding types of characteristic values, and in the selection step, the recommended component is selected based on the plurality of types of recommended values and the plurality of types of characteristic values.

7. The system according to claim 1, wherein the processor selects the recommended component based on a distance between the plurality of types of recommended values and the plurality of types of characteristic values on multidimensional coordinates having coordinate axes corresponding to the plurality of types of characteristic values.

8. The system according to claim 1, wherein the plurality of types of characteristic values includes at least a first characteristic value and a second characteristic value,
- the plurality of types of recommended values includes at least a first recommended value and a second recommended value corresponding to the first and second characteristic values, and
- the processor selects the recommended component based on a distance value calculated by a formula:

$$\text{distance} = \sqrt{[\{(\text{characteristic value} - \text{the first recommended value})/\gamma\}^2 + \{(\text{the second characteristic value} - \text{the second recommended value})/\delta\}^2]},$$

where $\gamma$ and $\delta$ are weighting coefficients.

9. The system according to claim 1, wherein the processor selects a plurality of recommended components from components listed in the component information.

* * * * *